United States Patent [19]

Sanderson et al.

[11] Patent Number: 5,783,237
[45] Date of Patent: Jul. 21, 1998

[54] RECYCLING SALT SOLUTION IN FOOD PROCESSING AND APPARATUS THEREFOR

[75] Inventors: Wayne Barry Sanderson; Anthony Phillip Brady, both of Brunswick; Graeme Frank Whitehead, Rochester; Ian James Oldham, Cobram, all of Australia; Ian Percival Brockwell, Edina, Minn.

[73] Assignee: Murray Goulburn Co-Operative Co. Limited, Australia

[21] Appl. No.: 583,049

[22] PCT Filed: Apr. 11, 1994

[86] PCT No.: PCT/AU94/00178

§ 371 Date: Apr. 15, 1996

§ 102(e) Date: Apr. 15, 1996

[87] PCT Pub. No.: WO94/23586

PCT Pub. Date: Oct. 27, 1994

[30] Foreign Application Priority Data

Apr. 13, 1993 [AU] Australia .................. PL 8239

[51] Int. Cl.$^6$ ............... A01J 27/02; A01J 25/16
[52] U.S. Cl. ............... 426/36; 426/41; 426/442; 99/452
[58] Field of Search ................ 426/36, 41, 582, 426/654, 442; 99/452, 453; 210/644, 648, 650, 642

[56] References Cited

U.S. PATENT DOCUMENTS

| | | |
|---|---|---|
| 3,078,169 | 2/1963 | McCadam . |
| 3,713,850 | 1/1973 | Gasbjerg ................ 99/452 |

(List continued on next page.)

FOREIGN PATENT DOCUMENTS

| | | |
|---|---|---|
| 6847581 | 3/1981 | Australia . |
| 2275688 | 9/1987 | Australia . |
| 0 102 879 | 2/1984 | European Pat. Off. . |
| 0 313 226 | 4/1989 | European Pat. Off. . |
| 2 072 480 | 10/1981 | United Kingdom . |
| 92/13463 | 8/1982 | WIPO . |

OTHER PUBLICATIONS

Willman, et al., *Home Cheesemaking*, pp. 30–41, 86, 87 (1993).
Jones, *Membrane and Separation Technology*, pp. 38–57 (1967).
Interscience Publishers, *Progress in Separation and Purification*, vol. 1, P V, pp. 332–333 (1968).

*Primary Examiner*—William H. Beisner
*Attorney, Agent, or Firm*—Fredrikson & Byron, PA

[57] ABSTRACT

A process is provided for the recovery and reuse of a salt solution obtained from a salty effluent (as herein defined) comprising: (1) passing said salty effluent, optionally after removing any fine particles therefrom, through a membrane filtration system which separates the salt in the form of a salt solution from the food residues; (2) passing said salt solution through an evaporator to decrease the water content thereof; (3) adjusting the temperature of the salt solution, typically within the range 15°–25° C., so as to control the concentration of the saturated salt solution obtained in step (4) herein below; (4) adding salt to said salt solution to produce a saturated salt solution; (5) adjusting the temperature of the saturated salt solution to that required in the salting of the food product; and (6) applying said salt solution to the food product. Also provided is an apparatus for the recovery and reuse of a salt solution obtained from a salty effluent (as herein defined) comprising: (1) a nanofiltration device for removing food residues from the salty effluent to produce a salt solution; (2) an evaporator connected to said device to decree the water content of the salt solution emanating from said device; (3) first heat control means connected to said evaporator for controlling the temperature of the salt solution emerging from the evaporator to control the concentration of the saturated salt solution referred to in paragraph 4 below; (4) means connected to said heat control means for adding salt to the salt solution to produce a saturated salt solution; and (5) second heat control means to control the temperature of the salt solution, prior to the application of said salt solution to the food product to be salted.

9 Claims, 1 Drawing Sheet

U.S. PATENT DOCUMENTS

| | | |
|---|---|---|
| 3,910,174 | 10/1975 | Nelles ......... 99/452 |
| 4,242,362 | 12/1980 | Grigsby et al. ......... 426/40 |
| 4,815,368 | 3/1989 | Nelles ......... 99/452 |
| 4,820,540 | 4/1989 | Budahn ......... 426/582 |
| 5,195,426 | 3/1993 | Thuli ......... 99/452 |
| 5,338,553 | 8/1994 | Johnson et al. ......... 426/41 |

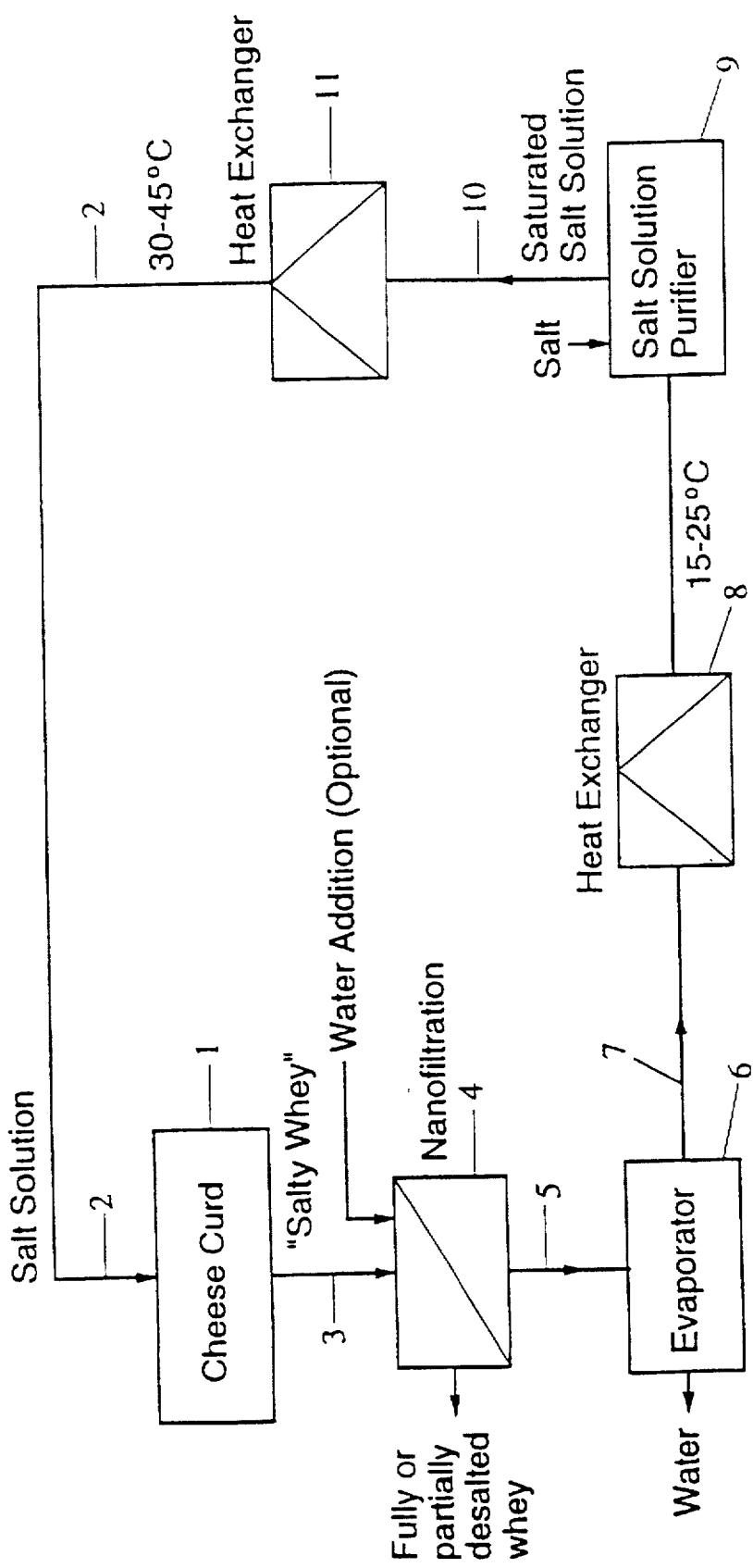

1

RECYCLING SALT SOLUTION IN FOOD PROCESSING AND APPARATUS THEREFOR

FIELD OF THE INVENTION

This invention relates to the recovery and reuse of salt solutions in food processing, for instance, in the manufacture of cheese more particularly cheese curd where the cheese curd is salted prior to maturing to form the cheese.

BACKGROUND

When various food products are salted during processing, there is frequently a waste effluent containing salt contaminated with food residues such as fat, protein and carbohydrate (hereinafter referred to as "salty effluent"). This salty effluent is damaging to the environment and is wasteful in product components.

In the manufacture of cheese, salt (sodium chloride or blends of sodium and potassium chloride) is added to the cheese curd by means of either a saturated salt solution or very fine granular salt. Both of these processes currently have a number of difficulties apart from the afore-mentioned environmental and component waste problems. In the case of the addition of a saturated salt solution to the cheese curd, if one is to avoid microbiological contamination, a fresh batch of brine has to be made up for each step of salting the cheese curd and this has obvious economic and technical disadvantages. In the case of using very fine granular salt, there are problems associated with the correct metering of the salt into the cheese curd in that it is of course easier and more accurate to meter a brine solution (liquid) to the cheese curd in comparison with the use of granular salt (solid). Therefore, it will be appreciated that it would be of great advantage to be able to reuse the salt solution contained in the salty whey emanating from the salting treatment of cheese curd and recycle in some way this salt solution and utilize it in the salting of the cheese curd.

Not all of the salt passes into the cheese curd. The addition of salt or saturated salt solution to the cheese curd results in syneresis of the curd causing expulsion of water, whey components (fat, protein, lactose, etc) and some salt. This discharge of "salty whey" contains valuable milk (whey) components but cannot be usefully reprocessed because of the high salt content (e.g. typically 3 to 15%) and is difficult to dispose of because of its high Biological Oxygen Demand (BOD) and salinity level.

OBJECTIVES

Accordingly, it is a principal objective of the present invention to provide a process and apparatus which will enable recovery and reuse of the salt solution in salty whey thus eliminating the problems referred to above.

It is a more specific objective of the present invention to recover and reuse a salty solution from the "salty whey" obtained as a result of the salting of cheese curd, recover the food residues, and to reuse said salt solution in the salting of the cheese curd.

BRIEF DESCRIPTION OF THE DRAWING

The sole drawing is a flow chart schematically illustrating the present invention.

SUMMARY OF THE INVENTION

According to one aspect of the invention, there is provided a process for the recovery and reuse of a salt solution obtained from salty whey comprising (1) passing said salty whey, optionally after removing any fine particles therefrom, through a membrane filtration system which separates the salt in the form of a salt solution from the whey components;

(2) passing said salt solution through an evaporator to decrease the water content thereof;

(3) adjusting the temperature of the salt solution, so as to control the concentration of the saturated salt solution obtained in step (4) herein below;

(4) adding salt to said salt solution to produce a saturated salt solution;

(5) adjusting the temperature of the saturated salt solution to that required in the salting of the cheese curd; and (6) applying said salt solution to the cheese curd.

According to a preferred aspect of the invention, there is provided a process for the recovery and reuse of a salt solution obtained from salty whey comprising:

(1) a nanofiltration device for removing food residues from the salty whey to produce a salt solution;

(2) an evaporator connected to said device to decrease the water content of the salt solution emanating from said device;

(3) first heat control means connected to said evaporator for controlling the temperature of the salt solution emerging from the evaporator to control the concentration of the saturated salt solution referred to in paragraph 4 below;

(4) means connected to said heat control means for adding salt to the salt solution to produce a saturated salt solution; and (5) second heat control means to control the temperature of the salt solution, prior to the application of said salt solution to the food product to be salted.

PREFERRED EMBODIMENT

The invention will now be described and illustrated with reference to a preferred embodiment relating to the manufacture of cheese, more particularly salted cheese curd. The process and apparatus is illustrated in the accompanying FIGURE which represents a flow chart.

Referring to the flow chart in the FIGURE, cheese curd (1) is salted by means of the addition of a saturated salt solution (2) and produces, as an effluent, a "salty whey" (3) which is introduced into a nanofiltration unit (e.g. Filtration Engineering Co. Inc's Ultra Osmosis* membrane plant) (4) where the whey solids are filtered from the salty whey solution, optionally with the addition of water, leaving a salty solution (5) containing approximately 5–10% salt (e.g. sodium chloride). Solution (5) is introduced into an evaporator (6) which removes some of the water, thus increasing the salt concentration in the salt solution (approximately 14–18%). The thus concentrated solution (7) is then passed through a heat exchanger (8) which raises the temperature of the salt solution in a range 15° to 25° C. whence the solution is introduced into a salt solution purifier (9) (e.g. Akzo Salt, Inc's Pur-o-Pak salt solution purification system**) which adds salt to the solution producing a saturated salt solution (10).

\* Ultra Osmosis is a registered trade mark of Filtration Engineering Co. Inc.
\*\* Pur-o-Pak is a registered trade mark of Akzo Salt, Inc.

The saturated salt solution (10) is then passed through a heat exchanger (11) which raises the temperature of the solution to a temperature in the range of 30°–45° C., preferably 34°–36° C., depending on the concentration required, and is then added to the cheese curd and the process is then repeated as discussed above.

The degree of desalination in the nanofiltration unit can be increased by the process of diafiltration, i.e. injection of water into the salty whey stream during the nanofiltration process.

It will be appreciated that the above process has the following advantages:

(1) elimination of an undesirable effluent (e.g. "salty whey");
(2) reuse and utilization of salt in effluent;
(3) recovery of food components (e.g. whey solids) from effluent;
(4) possibility of using less expensive grade salt because the salt is used to make up a saturated salt solution instead of being used in fine granular form;
(5) the use of spray salting with a salt solution provides improved curd characteristics; and
(6) the use of spray salting with a salt solution provides better control (in metering) over final salt concentration in the cheese.

The following example describes an embodiment of the invention in connection with the production of cheese, more particularly, the salting of cheese curd. The description of the example may be read in conjunction with the flow sheet described herein above.

EXAMPLE

Milled cheddar cheese curd was allowed to fall directly onto the mellowing belt of an Alfamatic* cheese making machine and was conveyed towards the auger/tower distribution point. At this point, brine sprays are located above the mellowing belt and the cheese curd was sprayed with brine from 10 booms of sprays, 2 booms of sprays being located after the mill and before the first stirrer and 2 booms of sprays being located directly after the next 4 stirrers. There are a total of 44 sprays located along the 10 booms of spray applying brine to the cheese.

* Alfamatic is a trademark of Tetra Laval AB

The sprays applied the brine onto the curd as a light spray which covers the full width of the belt.

The above salting of the cheese curd produced approximately 20,000 liters of salty whey (each day) from the manufacture of approximately 95 tonnes of cheddar cheese. This whey had a salt content of approximately 13.0% and was at 30° C.

The whey was then passed through a vibrating sieve to remove particulate matter from the whey stream and was then stored in 2×10,000 liter fibreglass storage tanks before being further processed.

The whey in the storage tanks was introduced into an Ultra Osmosis Plant (Filtration Engineering Model 200-118) which operated on a batch process.

During the first stage, the tank was concentrated until the initial volume had been halved, after which diafiltration water was added at the same rate as the permeate was being removed until the conductivity of the whey was reduced to 40 Millisiemens/cm. The retentate (desalted whey), approximately 7000 liters/day, was then pumped back into the sweet whey stream for further processing.

The permeate (salt water) from the Ultra Osmosis Plant was held in a 15,000 liter storage tank and contained approximately 7.5% salt and was at approximately 35° C.

The permeate was then passed through an evaporator at a rate of 1600 liters/hour with approximately 7.5% salt. This was concentrated to 12.5–13.5% salt with a product discharge rate of 850 liters/hour. The condensate left the evaporator at 750 liters/hour.

The concentrated salt water leaving the evaporator was at approximately 50° C. and was delivered into a 4500 liter storage tank where the salt water was maintained at the above temperature.

From the storage tank the salt water was introduced into a heat exchanger where the salt water was cooled down to 20°–25° C. before entering a salt purifier/percolator where the salt water was allowed to flow through a bed of salt causing it to become fully saturated at this temperature.

The fully saturated salt water was then introduced into a tubular heat exchanger which uses hot water to heat the brine solution to 34°–36° C. which is the same temperature as the curd on the mellowing belt.

The brine solution was fed to the brine sprays where the brine is applied to the cheese curd as already described.

All percentages referred to in this specification and in the claims are percentages by weight.

We claim:

1. A process for the recovery and reuse of a salt solution obtained from salty whey resulting from the salt spraying of cheese curd particles, comprising:
   (1) passing said salty whey, optionally after removing any fine particles therefrom, through a nanofiltration device which separates the salt in the form of a salt solution from the whey components;
   (2) passing said salt solution through an evaporator to decrease the water content thereof;
   (3) adjusting the temperature of the salt solution, so as to control the concentration of the saturated salt solution obtained in step (4) herein below;
   (4) adding salt to said salt solution to produce a saturated salt solution;
   (5) subsequently, adjusting the temperature of the saturated salt solution to that required in the salting of the cheese curd particles; and
   (6) thereafter, spraying said salt solution onto the cheese curd particles.

2. Process as claimed in claim 1 wherein said salt solution is concentrated in said evaporator to approximately 14% to approximately 18% salt.

3. Process as claimed in claim 2 wherein the temperature of the salt solution in step (3) is in the range 15°–25° C.

4. Process as claimed in claim 1 wherein the temperature of the salt solution in step (3) is in the range 15°–25° C.

5. Process as claimed in any one of claims 1–4 wherein the temperature of the saturated salt solution in step (5) is in the range 30°–45° C.

6. Process as claimed in claim 5 wherein water is injected into the salty effluent whey during the introduction of said salty effluent whey into the nanofiltration device.

7. Process as claimed in any one of claims 1–4 and 6 wherein water is injected into the salty effluent whey during the introduction of said salty effluent whey into the nanofiltration device.

8. Apparatus for the recovery and reuse of a salt solution obtained from salty whey resulting from the salt spraying of cheese curd particles, comprising:
   (1) a nanofiltration device for removing food residues from the salty whey to produce a salt solution;
   (2) an evaporator connected to said nanofiltration device to decrease the water content of the salt solution emanating from said nanofiltration device;
   (3) a first heat exchanger connected to said evaporator for controlling the temperature of the salt solution emerging from the evaporator to control the concentration of the saturated salt solution referred to in paragraph 4 below;
   (4) means connected to said first heat exchanger for adding salt to the salt solution to produce a saturated salt solution; and
   (5) a second heat exchanger to control the temperature of the salt solution, prior to the spraying of said salt solution onto the cheese curd particles.

9. Apparatus as claimed in claim 8 wherein the means for adding salt to the salt solution to produce a saturated salt solution is a salt solution purifier.

* * * * *